(12) United States Patent   (10) Patent No.: US 12,435,816 B2
Ottersbach et al.   (45) Date of Patent:   Oct. 7, 2025

(54) THREE-DIMENSIONALLY DEFLECTABLE LINE GUIDE APPARATUS, IN PARTICULAR FOR A ROBOT

(71) Applicant: IGUS GMBH, Cologne (DE)

(72) Inventors: Jörg Ottersbach, Bornheim (DE); Ralf Steeger, Lohmar (DE); Irfan Krivdic, Cologne (DE); Matthias Meyer, Cologne (DE)

(73) Assignee: IGUS GMBH, Cologne (DE)

( * ) Notice: Subject to any disclaimer, the term of this patent is extended or adjusted under 35 U.S.C. 154(b) by 77 days.

(21) Appl. No.: 18/548,125

(22) PCT Filed: Feb. 28, 2022

(86) PCT No.: PCT/IB2022/000087
§ 371 (c)(1),
(2) Date: Aug. 28, 2023

(87) PCT Pub. No.: WO2022/180450
PCT Pub. Date: Sep. 1, 2022

(65) Prior Publication Data
US 2024/0301969 A1   Sep. 12, 2024

(30) Foreign Application Priority Data

Feb. 26, 2021   (DE) .................... 20 2020 100 995.0

(51) Int. Cl.
*F16L 3/015*   (2006.01)
*B25J 19/00*   (2006.01)
(Continued)

(52) U.S. Cl.
CPC ........... *F16L 3/015* (2013.01); *B25J 19/0025* (2013.01); *H02G 3/0475* (2013.01); *H02G 11/006* (2013.01)

(58) Field of Classification Search
CPC .... H02G 3/0475; H02G 11/006; F16G 13/16; F16G 13/015
See application file for complete search history.

(56) References Cited

U.S. PATENT DOCUMENTS 6,374,589 B1   4/2002   Kunert et al.
6,427,980 B2   8/2002   Blase
(Continued)

FOREIGN PATENT DOCUMENTS

DE   10030985   1/2002
DE   20305487   6/2003
(Continued)

OTHER PUBLICATIONS

International Search Report from corresponding PCT Appln. No. PCT/IB2022/000087, dated Sep. 6, 2022.
(Continued)

*Primary Examiner* — Timothy J Thompson
*Assistant Examiner* — Amol H Patel
(74) *Attorney, Agent, or Firm* — Grossman, Tucker, Perreault & Pfleger, PLLC

(57) ABSTRACT

A line guide apparatus for guiding lines, such as cables, hoses or the like, in particular on an industrial robot. The line guide apparatus comprises links which are connected in articulated manner by a three-dimensionally deflectable articulated connection. Provision is made for the line guide apparatus to have a variable-length portion, which comprises a number of links which are connected together so as to be longitudinally adjustable relative to one another, wherein an elastically longitudinally expandable return element exerts a return force on the variable-length portion, which counteracts elongation of the variable-length portion. The links are in particular connected or couplable in such a (Continued)

way that longitudinal adjustment of two links relative to one another brings about relative rotation thereof.

20 Claims, 9 Drawing Sheets

(51) Int. Cl.
  *F16G 13/16* (2006.01)
  *H02G 3/04* (2006.01)
  *H02G 11/00* (2006.01)

(56) References Cited

U.S. PATENT DOCUMENTS

| | | | |
|---|---|---|---|
| 7,278,253 B2 * | 10/2007 | Wehler | H02G 11/00 |
| | | | 248/51 |
| 7,439,446 B2 | 10/2008 | Blase et al. | |
| 10,247,328 B2 | 4/2019 | Jaeker et al. | |
| 11,462,893 B2 | 10/2022 | Jaeker et al. | |
| 2006/0258229 A1 * | 11/2006 | Harada | B25J 19/0025 |
| | | | 439/736 |
| 2021/0222819 A1 * | 7/2021 | Shiotani | F16L 57/06 |
| 2021/0262587 A1 | 8/2021 | Barten et al. | |

FOREIGN PATENT DOCUMENTS

| | | |
|---|---|---|
| DE | 20305679 | 7/2003 |
| DE | 202006006637 | 7/2006 |
| DE | 102010032920 | 2/2012 |
| DE | 102010032921 | 4/2012 |
| DE | 102013000905 | 7/2014 |
| DE | 202017101896 | 8/2018 |
| DE | 202018103418 | 1/2019 |
| DE | 202020100699 | 5/2020 |
| EP | 1200753 | 5/2003 |
| EP | 3126104 | 9/2019 |
| WO | 93/05556 | 3/1993 |
| WO | 03/084721 | 10/2003 |
| WO | 2017/195148 | 11/2017 |

OTHER PUBLICATIONS

International Preliminary Report on Patentability from corresponding PCT Appln. No. PCT/IB2022/000087, dated May 19, 2023.

* cited by examiner

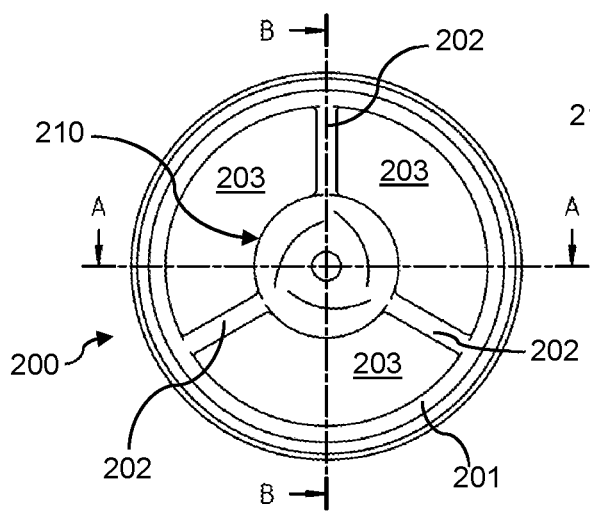
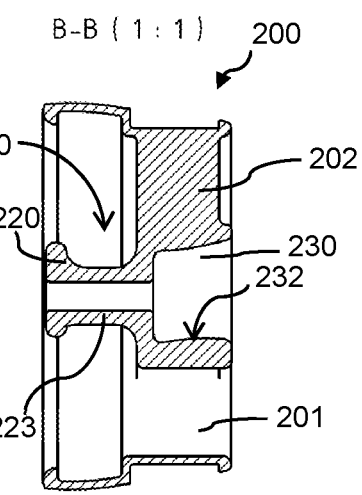
FIG.2C
FIG.2B
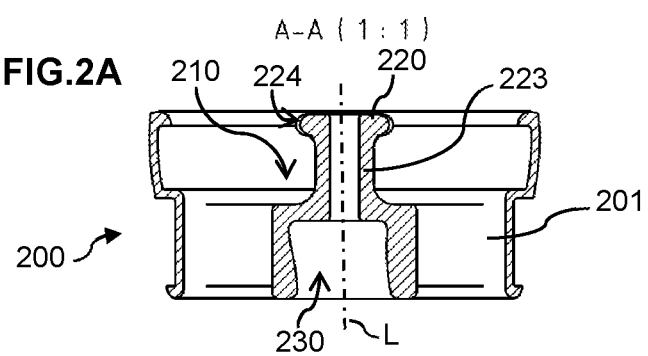
FIG.2A
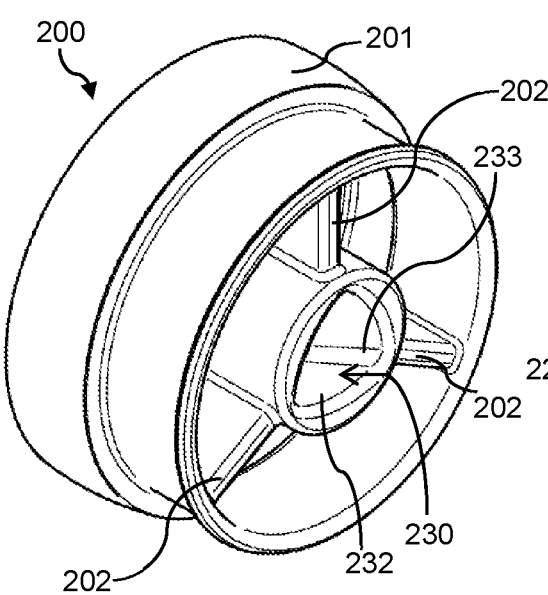
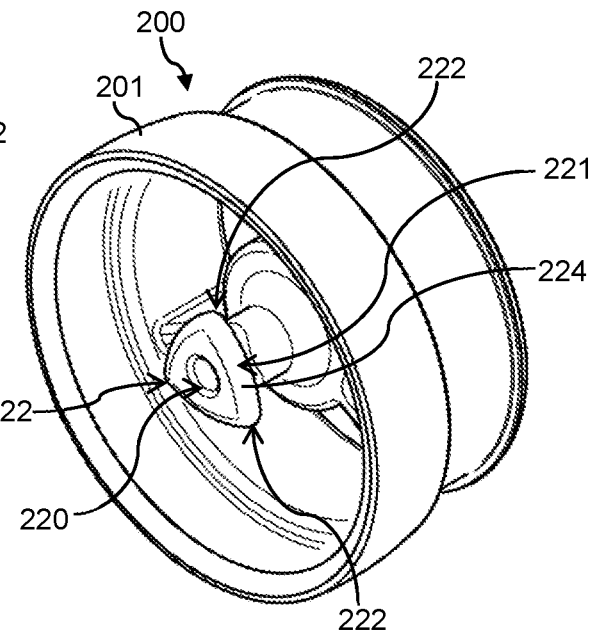
FIG.2D    FIG.2E

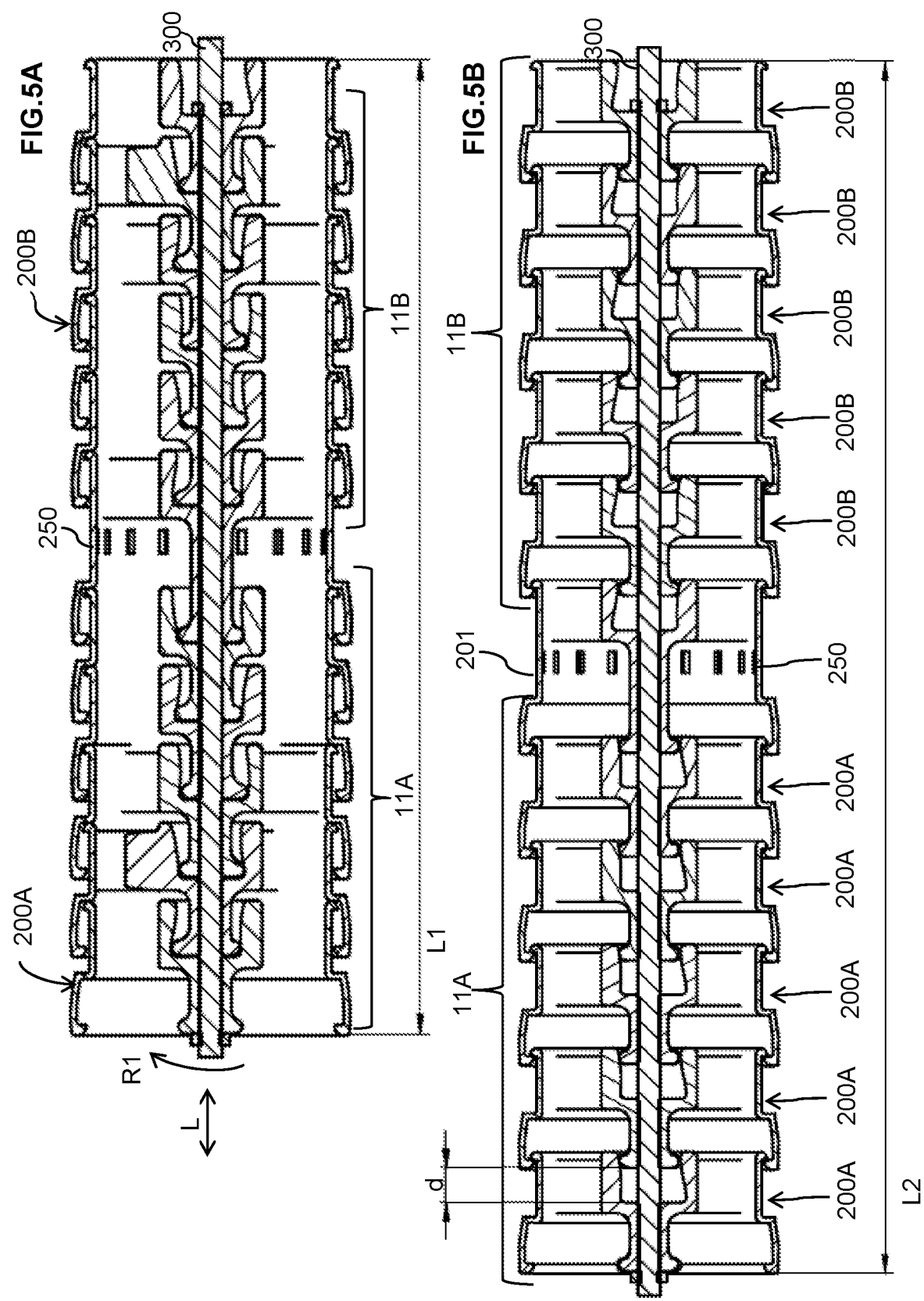

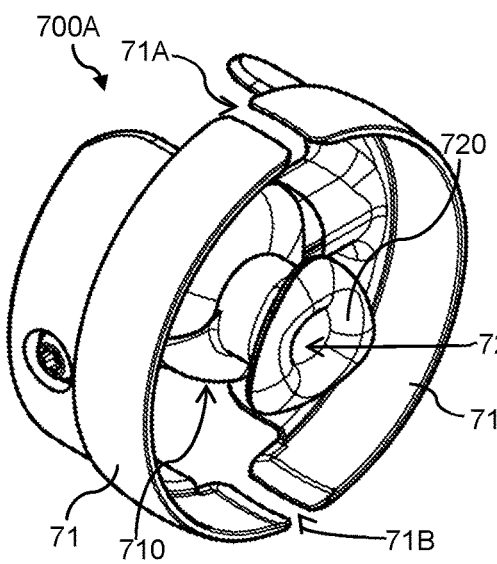 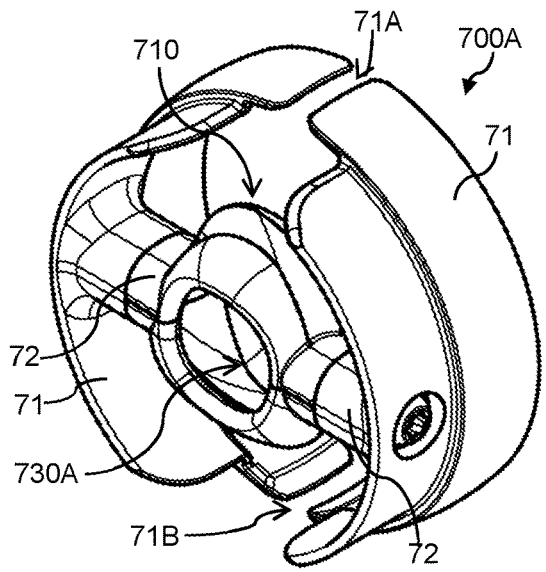
FIG.7A  FIG.7B
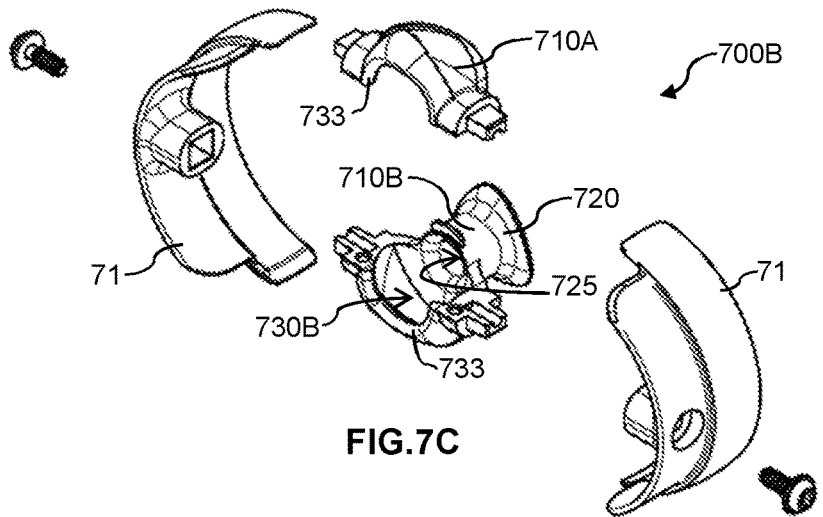
FIG.7C
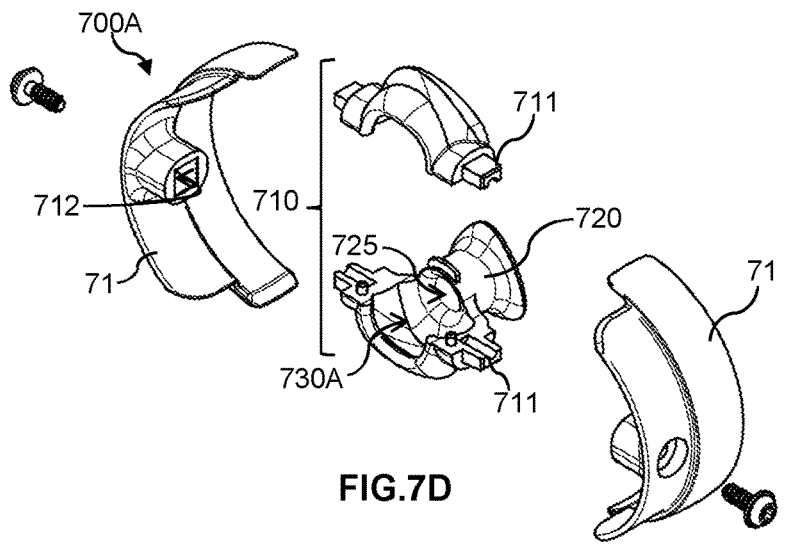
FIG.7D

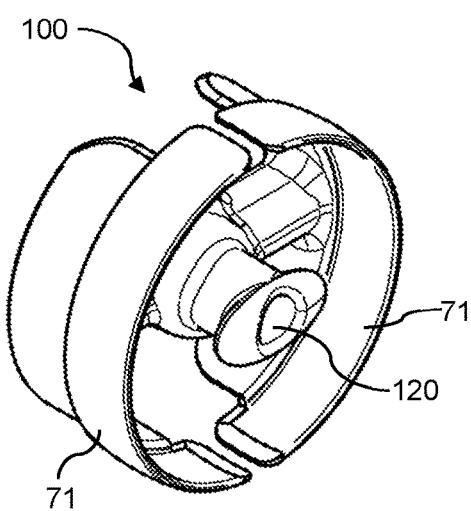
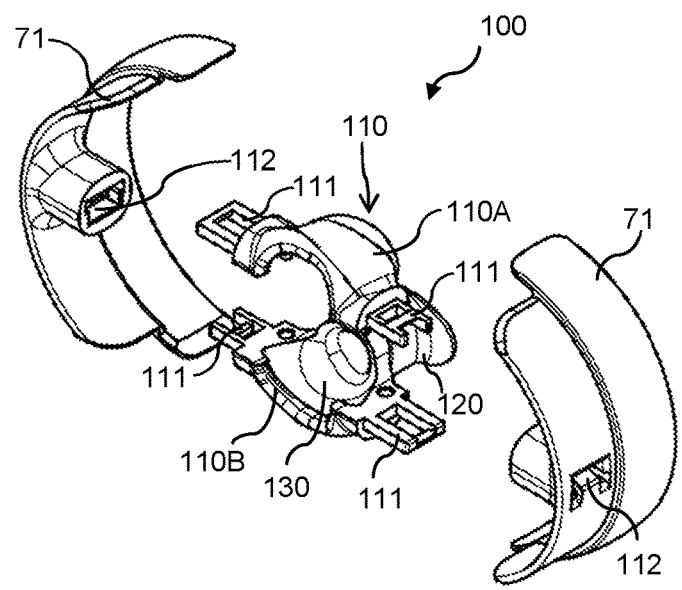
FIG.10A  FIG.10B
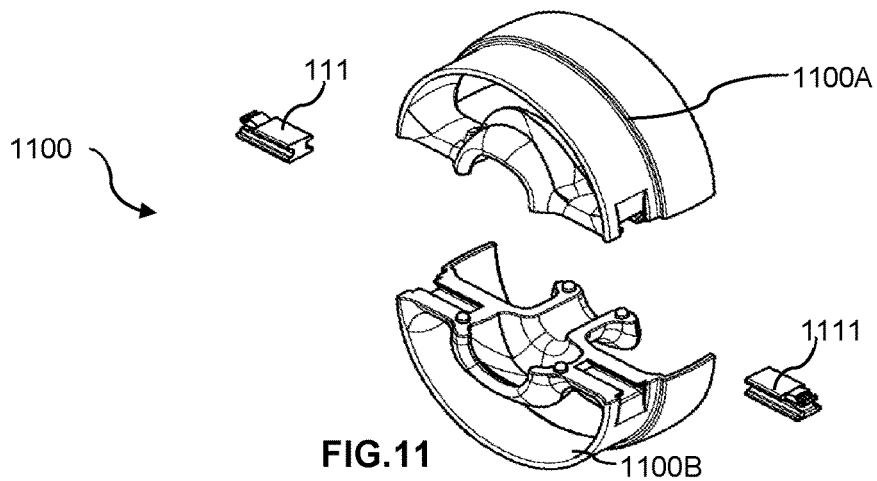
FIG.11
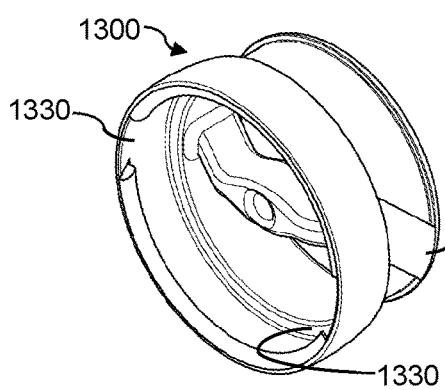
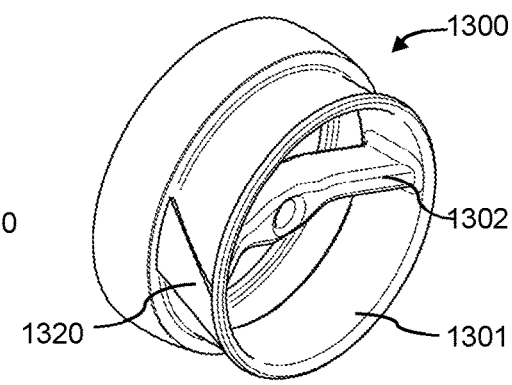
FIG.13A  FIG.13B

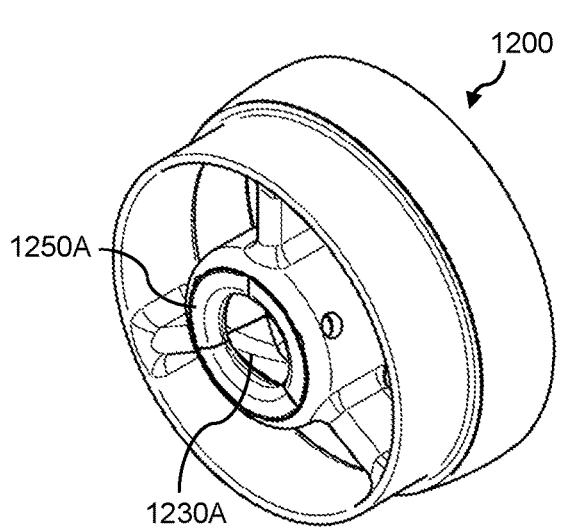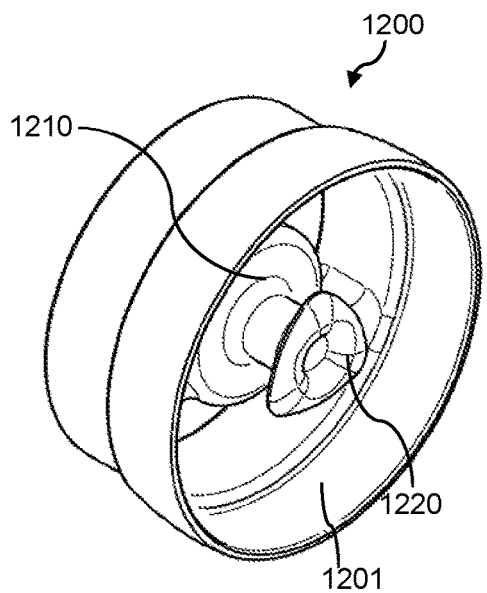
FIG.12A                FIG.12B
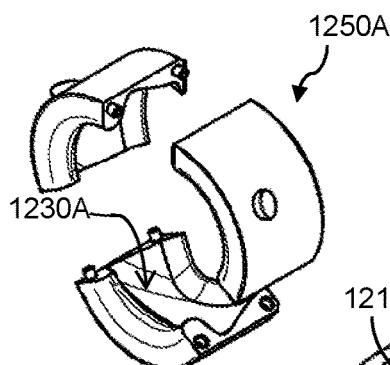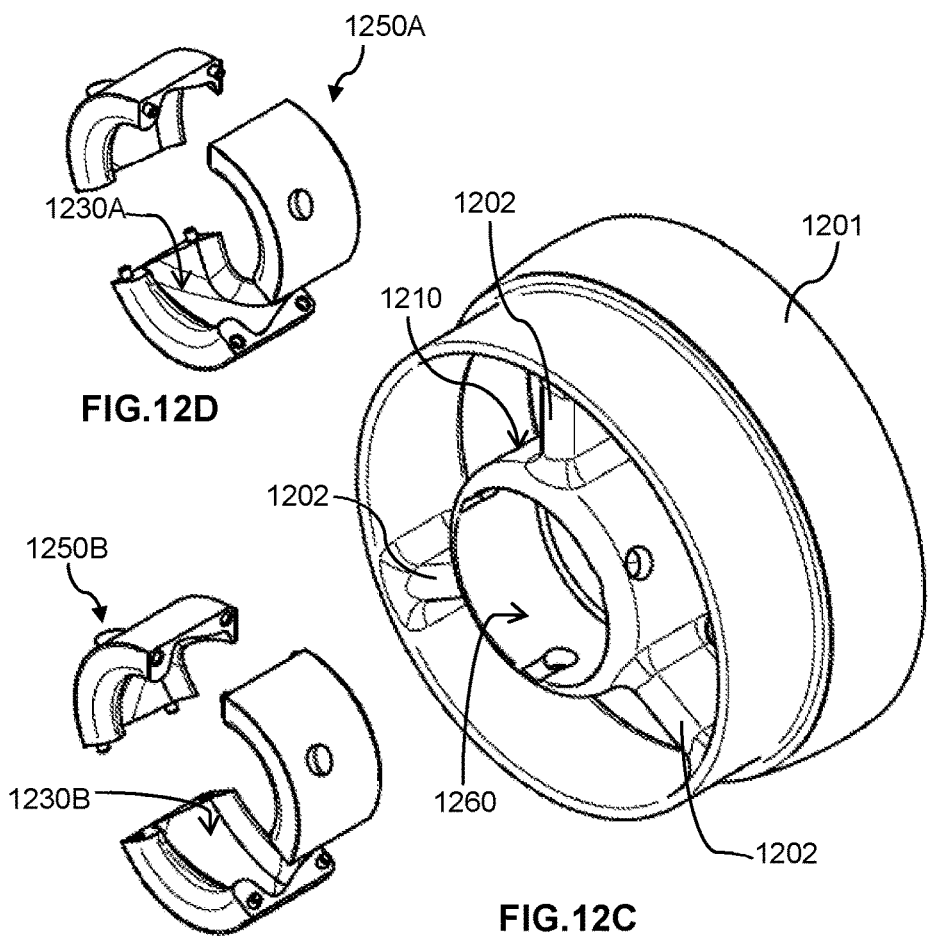
FIG.12D
FIG.12C
FIG.12E

THREE-DIMENSIONALLY DEFLECTABLE LINE GUIDE APPARATUS, IN PARTICULAR FOR A ROBOT

FIELD

The invention relates in general to a line guide apparatus for dynamically guiding lines, such as for example cables, hoses or the like, between two connection points at least one of which is mobile relative to the other. The invention relates in particular to such a line guide apparatus which is suitable for use on a robot with multiple degrees of freedom, in particular on an industrial robot or industrial articulated-arm robot.

BACKGROUND

Robot is here taken to mean, in general, any type of manipulating apparatus which is operated automatically, but in particular industrial articulated-arm robots with multiple degrees of freedom. The present invention is not, however, restricted to use in robots, but may also advantageously be used elsewhere, for example in lifting devices or the like.

The line guide apparatus serves in protected guidance of lines, in particular supply lines for supplying power, signals and/or operating media. In an articulated-arm robot, the lines serve for example to supply the tool arranged on the end effector, also known as the robot hand.

The most varied line guide apparatuses, such as for example energy guide chains, are well known for providing protected guidance of lines between two relatively movable connection points.

The invention relates in particular to a line guide apparatus which comprises at least one three-dimensionally deflectable portion along the length thereof.

Such generic line guide apparatuses have for example already been proposed in patents EP 1 492 967 B1 or EP 1 616 376 B1. Such generic line guide apparatuses or energy chains comprise a plurality of links, which form an accommodation space for protective guidance of the lines, wherein the links are arranged in succession in a longitudinal direction and connected together in articulated manner by a respective articulated connection. An articulated connection between two links in each case allows three-dimensional deflection of the connected links relative to one another, which is necessary in particular but not exclusively for applications using articulated-arm robots or industrial robots.

In particular in the case of such applications, both the distance and the spatial position between the two relatively mobile connection points typically changes, for example between the third axis of an articulated-arm robot and the sixth axis or the end effector of an articulated-arm robot. To this end, a length of line guide apparatus is necessary which covers the greatest possible distance and angle of rotation between the connection points. To prevent uncontrolled movements in such applications due to positionally dependent excess length, "resetting" or "restoring" systems are already known from the prior art.

A common construction for such restoring systems comprises a longitudinally displaceably mounted deflection roller, about which the line guide apparatus is guided in such a way, forming a loop or a deflection arc, that the longitudinal adjustment of the deflection roller draws in or retracts the length of line guide apparatus which is not needed (restoring) depending on operating position. One example of such a restoring system or resetting system is known from patent EP 3 126 104 B1. The structure of such systems is however comparatively complex and occupies structural space, which may, inter alia, impair a robot's freedom of movement.

One solution for returning or resetting three-dimensionally deflectable line guide apparatuses or energy chains which is simplified in this respect was proposed in patent EP 1 200 753 B1. In this case, at least one resilient rod is provided in the accommodation space of the line guide apparatus for return purposes, which rod is resilient about its longitudinal axis and extends in the longitudinal direction in the accommodation space. As the chain links swivel, the rod produces a counteracting return force. However, this solution also requires a degree of structural space or movement play for movement of the longitudinal portion of the line guide apparatus provided with the resilient rod. Another solution with a spring arm, which however likewise requires structural space, for example about the robot arm, was proposed in DE 20 2006 0066 37 U1.

SUMMARY

In view of the above-described background of the invention, a first object of the present invention is therefore to propose a simplified, compact solution, which may in particular but not exclusively perform the function of a resetting system. The solution is in this case intended in particular to be suitable for articulated-arm robots.

A generic line guide apparatus serves to guide flexible lines, such as cables, hoses or the like, between a first and a second connection point movable relative to the first, in particular on a robot with multiple degrees of freedom. To this end, the line guide apparatus in particular comprises a plurality of links, which form an accommodation space for lines, are arranged successively in a longitudinal direction and are connected together in articulated manner by a respective articulated connection. The articulated connection in this case allows or enables three-dimensional deflection of the connected links relative to one another.

According to the invention, in the simplest embodiment thereof the line guide apparatus or energy guide chain comprises at least one elastic return element and has a portion of variable length. According to the invention, at least one longitudinal portion of the line guide apparatus or energy guide chain is thus configured such that the length of this longitudinal portion is modifiable or variable. The variable-length portion may in particular be extendable against a return force brought about by the elastic return element.

In this case, the variable-length portion in particular has a number of links which are connected together so as to be both relatively rotatable relative to one another about the longitudinal direction and longitudinally adjustable relative to one another for elongation of the variable-length portion in the longitudinal direction. In this case, the links may in particular be connected together in articulated manner and/or in particular connected or mechanically coupled in such a way that longitudinal adjustment of two links relative to one another brings about desired, predetermined relative rotation.

The return element is intended to be elastically longitudinally expandable and arranged in such a way that it exerts on the variable-length portion a return force which counteracts elongation of the variable-length portion.

A core concept of the invention consists in firstly enabling a change in length through the combination of permitted relative rotation of the links with the adjustability or displaceability of the links relative to one another in the longitudinal direction, since the lines to be accommodated are not in themselves longitudinally expandable, i.e. they fundamentally do not allow any elongation (wherein the lines per se are not an essential subject matter of the present invention). The invention is based inter alia on the recognition that laying the lines helically in the line guide apparatus allows lengthening within certain limits. This may be exploited by combining the permitted relative rotation and longitudinal adjustability between the links to bring about a comparatively simply retractable and extensible configuration or a configuration which is comparatively simply expandable in the longitudinal direction at least in one longitudinal portion of the line guide apparatus.

In combination with an elastically longitudinally expandable return element, a particularly simple, compact and lightweight return functionality can be achieved.

The spiral or helical course may in this case be predetermined by the links in the variable-length portion itself, or for example with optional widening by at least one appropriately deformable supporting element, for example a belt-type carrier, with an expandable helical or helicoidal basic shape, on which the lines are held in the variable-length portion.

The connection between the links may be articulated, with multiple degrees of freedom, or may be embodied for example as a type of screw joint.

If the variable-length portion itself predetermines the preferred helical course of the lines, the links thereof are accordingly preferably not freely rotatable relative to one another, but only in an appropriately predetermined manner.

In one such embodiment in particular, it is advantageous for the connection of the in each case successive links of the variable-length portion to be configured such that longitudinal adjustment of two links relative to one another, i.e. elongation or return to the retracted position depending on the direction, predetermines as a function of direction a relative rotation in either the one or the opposing direction of rotation about the longitudinal direction.

The connection between the links in the variable-length portion may comprise a type of forcible guide, in particular a rotary guide, which, on elongating longitudinal adjustment of the two links, brings about relative rotation thereof, i.e. of the one link relative to the other link, in a first direction of rotation and accordingly conversely, on return longitudinal adjustment of the two links, brings about opposing relative rotation thereof. If three-dimensional deflectability in the variable-length portion is not needed, this may be implemented for example by a screw joint for connecting the links. However, types of connection or joint are preferred which have additional degrees of freedom, allowing at least slight three-dimensional deflection between the links of the variable-length portion, in particular at least about two axes perpendicular to the longitudinal direction.

In one preferred configuration, the variable-length portion has a first sub-portion, in which connected links in each case rotate in relative manner on elongation in a first direction of rotation and on return rotate in relative manner in the opposite direction, and a second sub-portion, in which connected links rotate in relative manner on elongation in a second direction of rotation, which is the opposite direction to the first direction of rotation, and on return rotate in relative manner in the opposite direction. The relative rotation relates here, irrespective of the rotating link, to two successive connected links, i.e. the one link rotates relative to the other. Thus, preferably in each case in each sub-portion just one predetermined direction of rotation is allowed or brought about in the direction of extension or deployment (on elongation) and in the return direction only the opposing direction of rotation, i.e. relative rotation proceeds in one or the other direction depending on whether the variable-length portion is being extended or is contracting again. It may thus be ensured that helically running lines are moved to and fro in each case reliably between two opposing helical shapes, so avoiding excessive load.

Particularly preferably, the return element is arranged to exert pretensioning in the longitudinal direction, in particular pretensioning which is adjustable as required, in order to contract the variable-length portion, even in the case of relatively rigid lines, into a basic position which corresponds to the smallest possible longitudinal dimension, i.e. allows maximum elongation from this basic position. The return element thus reliably ensures restoration to the retracted shortest position.

The at least one elastic return element may in particular be embodied as a rope or band. A rubber cable, preferably with rubber threads and/or rubber bands and a braided cover, can in particular be used as return element. Alternatively, a suitable spiral spring may for example also be provided as the return element.

In one further development, an adjusting device for adjusting the pretensioning of the return element is provided at at least one end region of the variable-length portion, in particular at an end link of the variable-length portion.

For the lowest possible loading of the lines, in particular when using two sub-portions rotatable in opposite directions, a middle piece can be provided between two sub-portions of the variable-length portion, which piece has strain relief for the lines to be guided. The middle piece preferably has a greater structural length than the structural length or pitch of the number of links of the variable-length portion.

Such a middle piece may in particular be connected at its longitudinal ends with the sub-portions rotating in the opposite direction, for example in each case using opposing rotary guides or optionally also non-rotationally.

It is particularly preferable, in particular in the case of a rope-like return element, for at least the links of the variable-length portion in each case to have a central core with a central through-hole, through which the elastic return element is freely guided with play. This allows the elastic return element to be arranged on the neutral axis of the line guide. The return element is preferably guided through the core with play, and with low friction and wear.

A central core is not absolutely essential, if for instance connection of the links is achieved using tubular shell portions. The construction with central core is particularly preferable, however, for example if it is the variable-length portion itself-without additional supporting components for the lines-which predetermines the desired course of the lines.

A central core may preferably have or form guide elements of the rotary guide and/or preferably predetermine relative rotation in the one or in the opposite direction of rotation, as a function of direction, about the longitudinal direction on longitudinal adjustment of two links relative to one another. The core may for example on both sides form the joint parts of a screw joint or a more complex joint with more degrees of freedom. Alternatively, the desired relative rotation may also be achieved by way of radially outer guide parts, for example a rotary guide, on shell parts of the links.

Provision is preferably made for at least the links of the variable-length portion or of each sub-portion, or also all the links, in each case to have a central core, which forms a joint head and a joint receptacle opposite in the longitudinal direction, which latter is matchingly configured for articulated connection with the joint head of the next link.

In this case, joint head and joint receptacle preferably simultaneously form the rotary guide for predetermining an intended or desired relative rotation, in particular by one or more helically running guide faces, for example with helically running trough-like wells, on the inside of the joint receptacle. For instance, joint head and joint receptacle may interact with one or more guide elements on the joint head to predetermine the relative rotation.

Different shapes of joint head and interacting joint receptacle fall within the scope of the invention.

In one variant, provision is made for the joint head to have a basic shape with a substantially triangular cross-section, preferably with arcuately rounded sides, whose three vertices are guided as guide elements against corresponding helically running guide faces on the inside of the joint receptacle.

In another variant, provision is made for the joint head to have a basic shape with a substantially elliptical cross-section, whose two major vertices are guided as guide elements against corresponding helically running guide faces on the inside of the joint receptacle.

In principle, joint head and joint receptacle may, when suitably configured, form an articulated connection which is longitudinally adjustable, relatively rotatable and, for three-dimensional mutual deflection of the connected links, swivelable about at least two axes perpendicular to the longitudinal direction, wherein in particular the sides of the basic shape of the joint head are concavely shaped in the longitudinal section, in particular corresponding to a radius of curvature for three-dimensional deflectability. In this case, joint head and joint receptacle interact similarly to the action of a ball-and-socket joint.

To simplify assembly or for better manufacturability of the links according to the invention, in particular in injection-molded plastics material, joint head and joint receptacle are preferably formed by two separate plastics material components. This may in particular be achieved by two-part construction of the core, for example with two complementary injection molded parts which can be fitted together, and which are preferably connectable on an interface plane placed onto the longitudinal axis. In this way, it is in particular possible more easily or favorably to produce the complex geometry of the receptacle, in particular to achieve the desired rotational and translational relative adjustment. The complementary core parts may in this case be connected in interlocking and/or non-interlocking manner.

To simplify assembly or adjustability of the direction of rotation, the joint receptacle itself may also be formed by at least two separate insert parts, which are attached to the core in a receptacle, wherein each insert part preferably in each case has a helically running inner surface.

At least the links of the variable-length portion or of the sub-portions thereof or all links preferably in each case have a central core with at least two substantially radial webs by way of which in each case at least one shell segment is retained. The shell segments here serve to delimit the accommodation space in the radial direction, wherein the shell segments are preferably arranged in upwardly pivotable manner and/or are of flexible construction and form an insertion opening between each pair of shell segments. This simplifies installation or replacement of lines if needed. At least in the variable-length portion, the shell segments may optionally form a circumferentially and longitudinally closed tube. With such a configuration, the connection between in each case successive links may comprise a rotary guide at the shell segments, in particular with obliquely extending grooves and projections engaging therein at overlap areas of the shell segments.

In one variant, the connection longitudinally adjustable in the longitudinal direction in each case comprises at least two longitudinal stops, which restrict the longitudinal adjustment of two links in both directions. Corresponding longitudinal stops may be provided on the core and/or on shell segments. The two longitudinal stops for restricting extension and/or retraction are particularly preferably formed by a joint receptacle on the core. Thus, no configuration measures on the shell segments are needed for this purpose.

The longitudinal play or axial adjustment dimension of the longitudinally adjustable connection between adjacent links amounts preferably to at least 20%, preferably to at least 30% and in particular up to 45% of the link pitch or axial structural length of the link, in particular of the central core.

Depending on the desired properties, the line guide apparatus may be configured such that the plurality of links, which are connected in three-dimensionally deflectable manner, are embodied differently from the number of links in the variable-length portion, in particular are not longitudinally adjustable, i.e. are not adjustable or elongatable (are resistant to tensile stress) relative to one another in the direction of tensile force transmission or have a structural length which is invariable along the neutral axis.

Thus, three-dimensionally deflectable links of a first type, in particular of per se known design, which are not longitudinally adjustable relative to one another, may be connected to a line guide apparatus by links configured according to the invention of a second type, which are provided in the variable-length portion.

Links configured according to the invention differ in particular by the type of connection, in particular articulated connection, by which they are connected together in each case in pairs from three-dimensionally deflectable links of per se known design, and may, apart from this, have a design comparable or substantially identical to the known design, for example with regard to comprehensive delimitation by shell part or the like.

In one preferred embodiment, the longitudinal portion is connected with links configured according to the invention for length modification with at least one longitudinal portion resistant to tensile stress, which is not of variable length, and which consists of three-dimensionally deflectable links of another type. The variable-length portion may for example be provided between two such longitudinal portions of non-variable length.

Alternatively, depending on use, all the links of the line guide apparatus may also be three-dimensionally deflectable and embodied to be longitudinally adjustable and relatively rotatable relative to one another. The entire line guide apparatus may consist of links which are both connected three-dimensionally deflectably and allow variable-length adjustment.

In the sub-portions rotatable in opposite directions, the links may be of substantially structurally identical construction apart from the different directions of rotation in the preferably articulated connection and be connected via an additional middle piece.

When in use, the line guide apparatus typically has at least one line guided therein, wherein the at least one line is arranged to run helicoidally or helically in the variable-length portion, in particular corresponding to a first helix coil in the first sub-portion and a second helix coil in the second sub-portion running with an opposing direction of rotation.

The invention further relates also to a robot, in particular an industrial articulated-arm robot, with a line guide apparatus according to one of the above-described configurations.

The invention is usable for any type of supply lines, such as cables, hoses or the like, in particular for power and data supply lines, but also compressed air hoses and the like.

BRIEF DESCRIPTION OF DRAWINGS

Further details, features and advantages of the invention are revealed by the following, detailed description of preferred embodiments made with reference to the appended figures, in which:

FIG. 2A-FIG. 2E show views of a first exemplary embodiment of a chain link according to the invention for an elongatable line guide apparatus;

FIGS. 5A-5B show a particularly preferred arrangement with an elongatable, variable-length portion with two sub-portions, rotatable in opposing directions, of links according to FIGS. 2A-2E;

FIG. 7A-FIG. 7D show views of two chain links of the second exemplary embodiment, in perspective view (FIGS. 7A, 7B), and in exploded view with one chain link for a joint rotating clockwise (FIG. 7C) and one chain link for a joint rotating anticlockwise (FIG. 7D);

FIG. 10A-FIG. 10B are perspective views of a chain link according to a third exemplary embodiment of the invention as a variant of FIG. 7, for example for larger diameters;

FIG. 11 is a perspective view of a chain link according to a fourth exemplary embodiment of the invention;

FIGS. 12A-12C show perspective views of a chain link according to a fifth exemplary embodiment of the invention, as a variant of FIG. 2, with two interchangeable multipart inserts of a joint receptacle (FIG. 12D, FIG. 12E), which selectably predetermine one of two opposing directions of rotation; and FIGS. 13A-13B show a perspective view of a chain link according to a sixth exemplary embodiment of the invention, as a variant of FIG. 2.

DETAILED DESCRIPTION

Figure 1A:
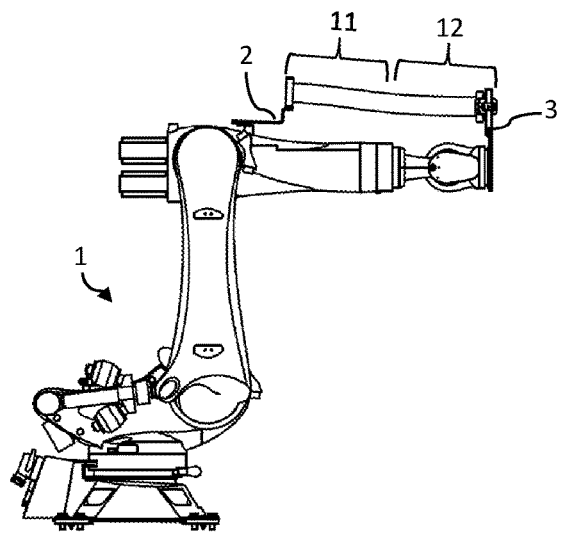
FIGS. 1A-1D show side views and perspective views of an articulated-arm robot with a line guide apparatus according to the invention, in a first position (FIGS. 1A-1B), in which the line guide apparatus is retracted or restored, and a second position (FIGS. 1C-1D), in which the line guide apparatus is extended.
Figure 1B:
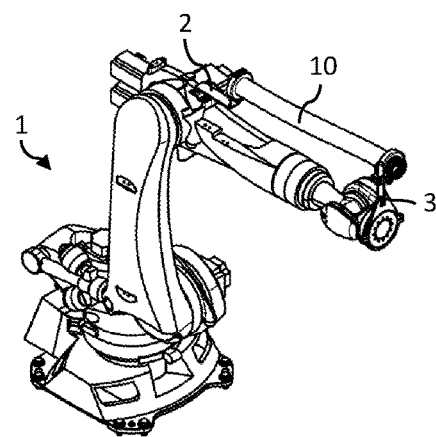
Figure 1C:
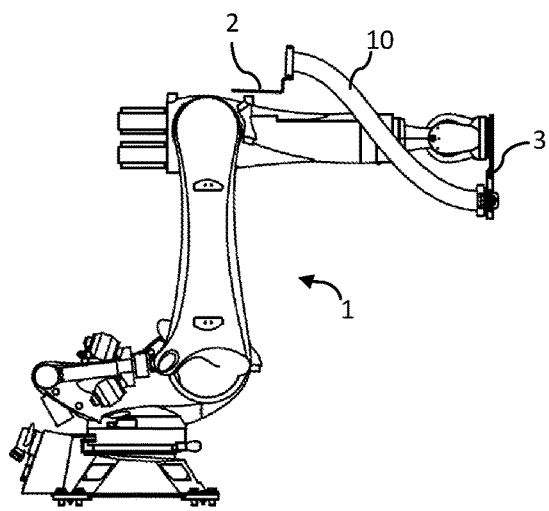
Figure 1D:
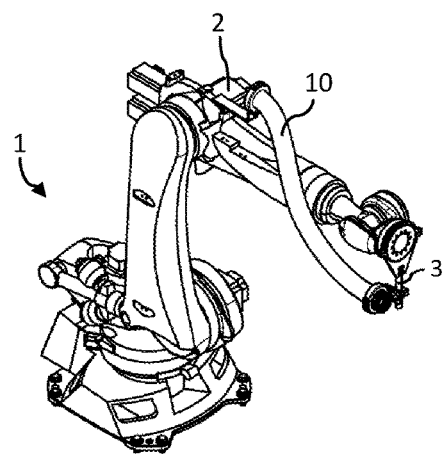

FIGS. 1A-1D show as an example of an industrial robot an articulated-arm robot 1, here with serial kinematics, for example a 6-axis buckling arm robot of per se known construction. The invention is particularly but not exclusively advantageously applicable to such robot arms with multiple degrees of freedom. Between two connection points 2, 3, here for example on the third and sixth axes, a line guide apparatus 10 is arranged, wherein the line guide apparatus 10 is secured at the end using clips to the two connection points 2, 3 on the articulated-arm robot 1. The connection point 3 is movable in space relative to the connection point 2 in accordance with the robot axes (fourth to sixth axes).

The line guide apparatus 10 has, as FIG. 1A shows, at least one variable-length first portion 11, to which a three-dimensionally deflectable second portion 12 is connected. The portions 11, 12 may respectively both be three-dimensionally deflectable and variable in length. Alternatively, just the first portion 11 may be of variable length, and optionally also three-dimensionally deflectable, whereas the second portion 12 comprises per se known chain links. The second portion 12 may for example comprise chain links according to a construction from EP 1 616 376 B1 or U.S. Pat. No. 7,439,446 B2 (=WO 2004/093279 A1, the teaching of which in this respect is included herein by reference) or be assembled from such known chain links.

The connection between the first portion 11 and the second portion 12 (FIG. 1A) may here be achieved by a particular connection piece or end piece, as described further below.

FIG. 2A-FIG. 2E show a first example of a chain link 200 for forming a variable-length portion 11. In the per se known construction, the chain link 200 comprises a shell 201, which in this example is embodied closed circumferentially about the longitudinal axis L. The shell 201 is connected to a core 210 of the chain link 200 by three radial webs 202, and may for example be made in one piece from plastics material. Between shell 201 and core 210, the chain link 200 forms three chambers 203, separated by the webs 202, as accommodation spaces for lines (not shown). The chambers are open throughout in the axial direction. Shell 201 and webs 202 are for example arranged and configured rotationally symmetrically about the longitudinal axis L.

Figure 3B:
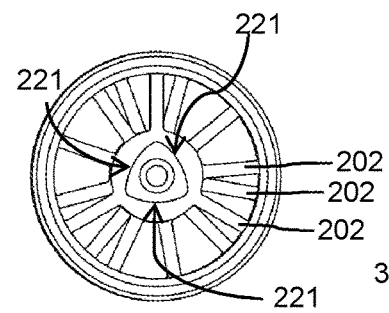
FIGS. 3A-3D show an elongatable, variable-length portion with a purely exemplary number of links according to FIGS. 2A-2E, in a retracted state, in longitudinal section (FIG. 3A) and in front view (FIG. 3B), and in an extended, elongated state, in longitudinal section (FIG. 3C) and in front view (FIG. 3D), with an elastic return element for return into the retracted state.
Figure 3D:
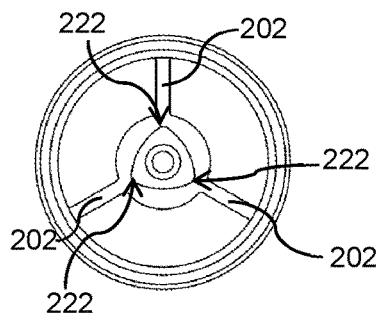
Figure 3A:
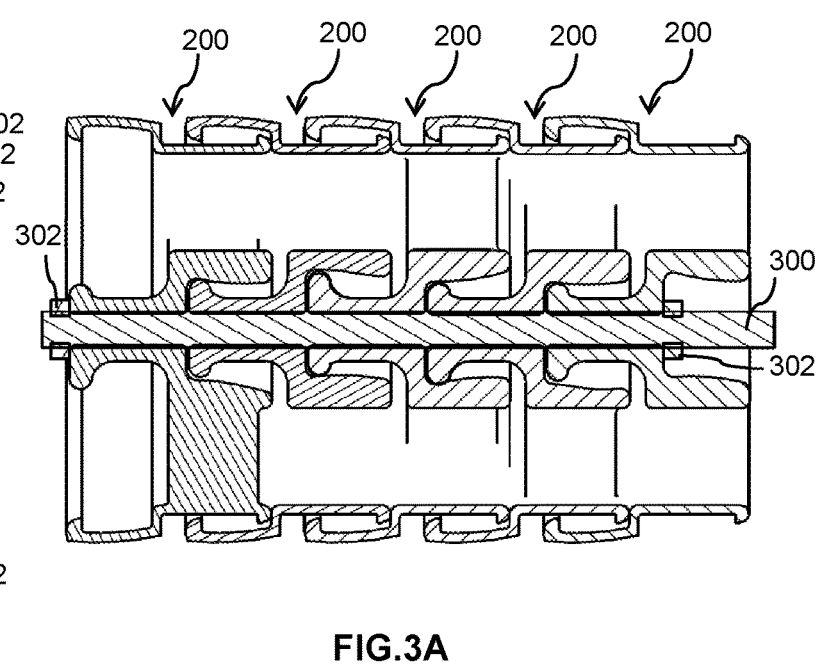
Figure 3C:
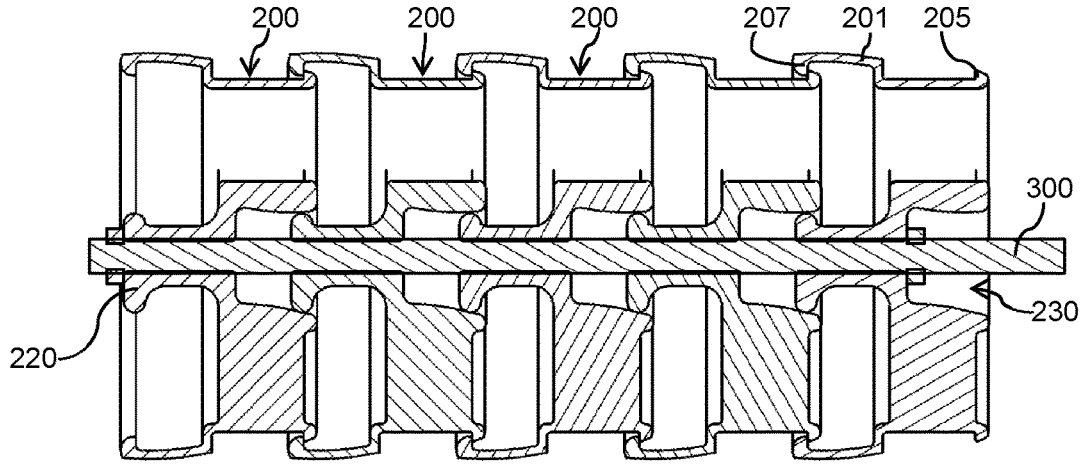

One particular aspect of the invention lies in the configuration of the connection between successive chain links 200, as shown by FIGS. 3A-3C on the basis of an exemplary portion of chain links 200. To connect adjacent chain links 200, the core 210 has a joint head 220 at one longitudinal end and at the other longitudinal end it has a joint receptacle 230 of conjugate configuration. Joint head 220 and joint receptacle 230 are configured such that connected chain links 200 are longitudinally adjustable relative to one another in the longitudinal direction, as a comparison between FIG. 3A and FIG. 3C shows, and in such a manner that longitudinal adjustment of two chain links 200 relative to one another brings about relative rotation thereof by a predetermined angular amount, as illustrated by way of the front views in FIG. 3B or FIG. 3D.

The geometry of the joint head 220, which is most apparent in FIGS. 2A-2B and FIG. 2E, has in this example a basic shape with substantially triangular cross-section perpendicular to longitudinal axis L, wherein in this cross-section the sides 221 are arcuately rounded in accordance with a first radius, cf. FIG. 3B, and the vertices 222 or points are rounded in accordance with a markedly smaller second radius, cf. FIG. 3D. In each longitudinal section along the longitudinal axis, the outer face of the arcuately triangular joint head 220 is additionally rounded according to a comparatively small, third radius, i.e. this rounded portion is provided circumferentially as shown in FIG. 2A with FIG. 2E. Thus, in the joint receptacle 230, only curvilinear contact can be achieved in accordance with the contour of the largest cross-sectional area, wherein the rounded portion allows tilting or ball joint-type movement in the axial direction or in accordance with the third radius about two axes perpendicular to the longitudinal axis. The joint head 220 is connected in one piece with the wall of the joint receptacle 230 via a neck-like journal 223.

FIG. 3A and FIG. 3C additionally show a return element 300, in the form of an expander rope or rope-like rubber cable. This preferably consists of highly elastic rubber threads and a braided cover for protection thereof. The return element 300 is passed coaxially to longitudinal axis L through corresponding central passage openings 225 in the core 210 and, at the ends of the variable-length portion 11, is fastened to the chain links 200, for example using clamping rings 302, so as to be resistant to tensile stress. The return element 300 is intended to be elastically longitudinally expandable and exerts an axially directed return force on the variable-length portion 11, which counteracts elongation of the variable-length portion, i.e. the portion is restored from the extended position in FIG. 3C into the retracted position in FIG. 3A.

The joint head 220 of each connection of two chain links 200 here interacts with the inner surface 232 of the joint receptacle 230 in such a way that the connection acts as a rotary guide or forcible guide, which, in the event of longitudinal adjustment (FIG. 3A to FIG. 3C), rotates the chain links 200 relative to one another in a first direction of rotation and, in the event of return longitudinal adjustment, brings about the opposite relative rotation thereof. To this end, the joint receptacle 230 is provided with an inner surface 232, which corresponds to helical rotation of the outer contour of the joint head 220. In other words, the inner surface 232 corresponds to a surface generated by rotating the contour of the joint head 220 in the event of axial feed. Accordingly, the joint receptacle 230 forms a negative shape for rotatable and longitudinally adjustable mounting of the joint head 220, in particular a negative shape which is conjugate with the volume generated by corresponding rotary translation of the joint head 220, plus the movement play which is technically necessary. Thus, the three vertices 222 of the joint head 220 are guided as guide elements against corresponding helically running guide faces, which form trough-like and helical wells similar to a type of internal thread, on the inside of the joint receptacle 230. The chain links 200 are connected or coupled in such a way that longitudinal adjustment of two links relative to one another brings about relative rotation thereof, depending on retraction or extension in one or the other direction of rotation.

As longitudinal stops for restricting maximum extension or elongation, the shells 201 in each case engage lockingly inside one another in the inserted position. To this end, the shell 201 has a circumferential annular groove with a rear annular rim 205 as limit stop and an inwardly projecting annular collar 207, which strikes against the rim 205 as mating stop. Longitudinal stops are preferred, inter alia because although the return element 300 clamps the chain links 200 against one another, breakage of the return element 300 should not result in separation of the variable-length portion 11 of the line guide apparatus or energy chain 10. The longitudinal stops may however also be differently implemented, for example on the central core (see further below).

Figure 4:
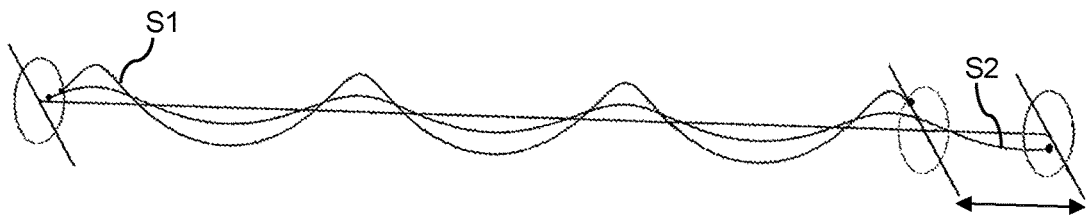
FIG. 4 shows a schematic representation of the line behavior or of the helical line course of lines guided in a line guide apparatus according to the invention in a retracted state and in an extended state.

FIG. 4 is a schematic illustration of two different helical or helicoidal courses S1 and S2 of a line, which is guided in a variable-length portion. Position S1 corresponds to the retracted or restored position of the line guide apparatus 10 (cf. FIGS. 1A-1B). Position S2 corresponds to the extended position of the line guide apparatus 10 (cf. FIGS. 1C-1D).

FIGS. 5A-5B illustrate a particularly preferred embodiment, wherein the variable-length portion 11 has a first sub-portion 11A, in which connected chain links 200A in each case rotate relatively in a first direction of rotation R1 about the longitudinal direction L on elongation and in the opposite direction R2 on restoration. Furthermore, the variable-length portion has a second sub-portion 11B, in which connected chain links 200B rotate relatively in the second direction of rotation R2 in the opposite direction to the first direction of rotation R1 on elongation, and in the opposite direction in the first direction of rotation R1 on restoration. In this way, the rotations of the sub-portions 11A, 11B cancel each other out, such that overall, at the ends of the variable-length portion 11, no rotation is transmitted and also the lines are treated gently. The number of links 200A, 200B is preferably equal in the two sub-portions 11A, 11B. The construction of the links 200A, 200B of each sub-portion 11A, 11B differs merely in the direction of rotation predetermined by the respective joint receptacle 230, i.e. the joint receptacles 230 have opposing directions. Thus, in one sub-portion 11A, the links rotate clockwise relative to one another on elongation or extension (e.g. R1) and, in the other sub-portion 11B, they rotate anticlockwise relative to one another on extension (e.g. R2) or vice versa, and accordingly rotate back in the opposite direction when retracted again.

In this case, moreover, a special middle piece 250 is provided between the sub-portions 11A, 11B of the variable-length portion. The middle piece 250 allows strain relief for the lines to be guided, for example on the basis of corresponding slots in the shell. The middle piece 250 preferably has a greater structural length than the structural length or pitch of the links 200A, 200B.

The middle piece 250 may have a core 252 which is configured at its longitudinal ends in accordance with the links 200A, 200B and is connected with the opposing rotating sub-portions 11A, 11B.

The deliberately permissible relative adjustment amount between two links 200A and 200B respectively in the longitudinal direction, which is allowed as play for the longitudinally adjustable connection, is designated d in FIG. 5B, and adds up over all the chain links of the variable-length portion 11 to the maximum length difference L2–L1 in the fully extended position (FIG. 5B).

Another preferred exemplary embodiment will now be explained in greater detail on the basis of FIGS. 6-9.

Figure 6A:
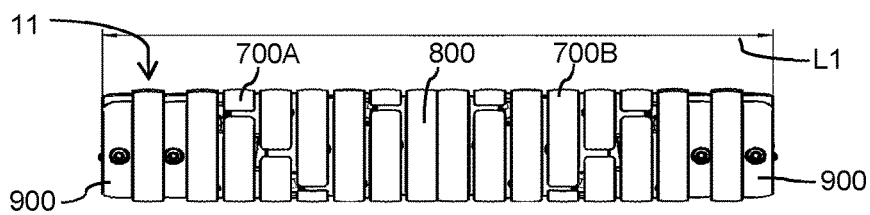
FIGS. 6A-6G show side views of a second exemplary embodiment of an elongatable longitudinal portion of a line guide apparatus, in the retracted state (FIGS. 6A, 6C) and extended state (FIGS. 6B, 6D) of the longitudinal portion, and in a side view relative to the course of the lines guided therein, in the fully retracted state (FIG. 6E), in the semi-extended state (FIG. 6F) and in the fully extended state (FIG. 6G) with a percentage indication of an achievable change in length.
Figure 6B:
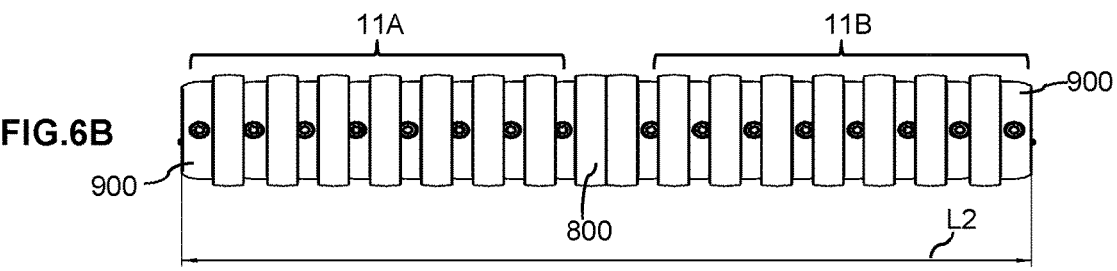
Figures 6C, 6D:
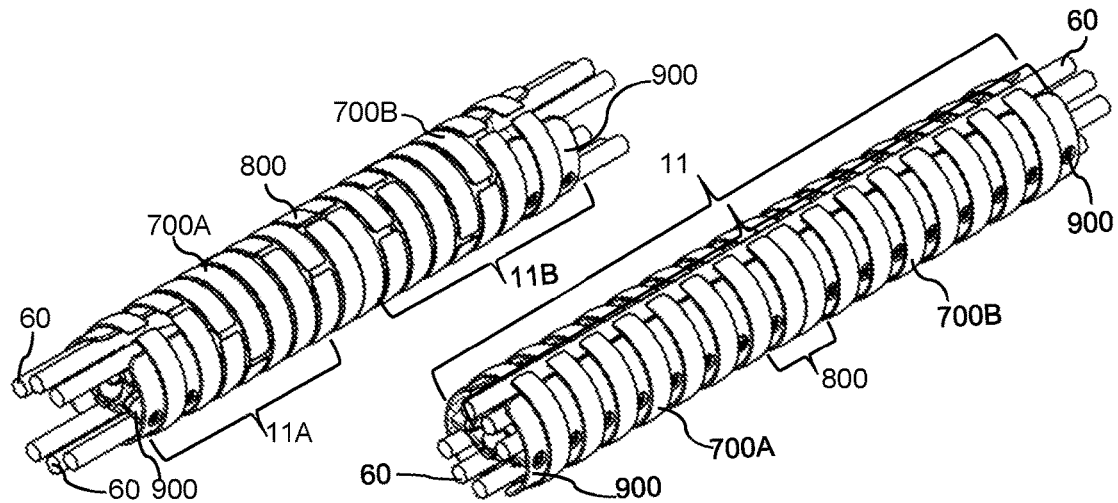

FIGS. 6A-6D show a variable-length portion 11, made up of two sub-portions 11A, 11B, of a line guide apparatus 10 for an arrangement according to FIG. 1A. The sub-portions 11A, 11B likewise rotate in themselves in opposite directions to one another, on extension from the fully retracted state with length L1 (FIG. 6A, FIG. 6C) into the fully extended state with length L2 (FIG. 6B, FIG. 6D), for example with 1.3*L1≤L2≤1.5*L1, for instance with L2=140%*L1 (FIG. 6G). The sub-portions 11A, 11B are to this end assembled from connected chain links 700A and 700B respectively according to FIGS. 7A-7D and connected together via a special middle piece 800 according to FIG. 8 at which the guided lines 60 undergo strain relief. At the end, each sub-portion 11A, 11B has a special end piece 900 for connection in each case with a longitudinal portion of conventional chain links, for example constructed according to EP 1 616 376 B1 or U.S. Pat. No. 7,439,446 B2 (=WO 2004/093279 A1). As described further above and illustrated in FIGS. 6A-6D, here too the two sub-portions 11A, 11B can be telescopically extended or elongated with rotation in opposing directions, clockwise and anticlockwise respectively relative to one another.

Figure 6E:
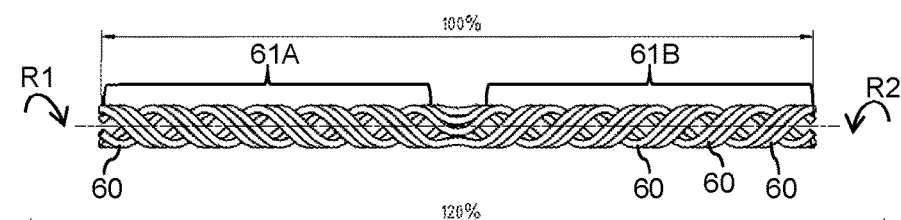
Figure 6F:
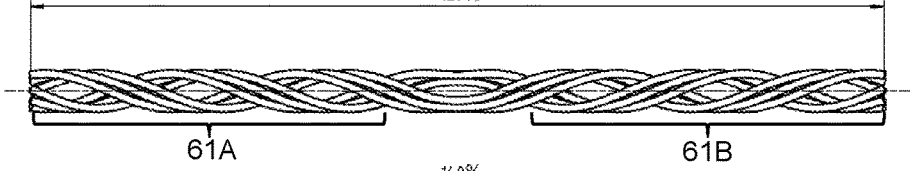
Figure 6G:
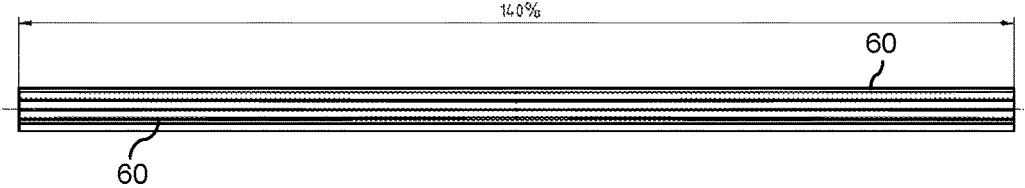

FIGS. 6E-6G show an exemplary arrangement and the course of, here for example, six guided lines 60, in portion 11. In the variable-length portion 11 each line runs helically or helicoidally, namely corresponding to a first helix coil 61A, for example rotating clockwise in direction R1, in the first sub-portion 11A and a second helix coil 61B running with an opposing direction of rotation, for example rotating anticlockwise, in the second sub-portion 11B. All the lines 60 are here twisted together into corresponding multi-helix bundles in the fully retracted state, and strain-relieved in a middle region at the middle piece 800 according to FIG. 8. The directions of rotation of the helix coils 61A, 61B correspond to the direction of rotation of the chain links 700A, 700B and are opposed to one another. In the fully extended state (FIG. 6G), the lines 60 are then substantially stretched into a straight line, i.e. the two helix coils 61A, 61B are unwound. To this end, in the fully extended state, the sub-portions 11A, 11B form straight, through-receptacles for the lines 60, cf. FIG. 6D.

FIGS. 7A-7D show in detail the second example of the chain links 700A, 700B for forming a variable-length portion 11 with oppositely rotating sub-portions 11A, 11B. For the sake of brevity, only substantial differences from FIGS. 2-5 are examined. The chain links 700A, 700B have arcuate shell segments 71, which are produced from identical parts (FIGS. 7C-7D). In FIGS. 7A-7D, the shell segments 71 are not closed circumferentially around the longitudinal axis L, but rather in each case on both sides form an insertion opening 71A, 71B for simplifying installation or replacement of lines 60. Each of the two shell segments 71 is connected by way of precisely one radial web 72 with a core 710 of the chain link 700A, 700B. Each chain link 700A, 700B thus here forms two separate axially open chambers for receiving the lines 60 (cf. FIG. 6D).

Each chain link 700A, 700B has a core 710 with, here also axially opposite, a joint head 720 at one longitudinal end and a conjugately configured joint receptacle 730A or 730B respectively at the other longitudinal end. For simpler manufacture, in particular of the complex geometry of the joint receptacle 730A or 730B respectively and for simplified installation of the joint head 720 in the joint receptacle 730, in FIGS. 7A-7D, the core 710 is made of two parts, here of a first part 710A comprising the joint head 720 and of a lid-like second part 710B for forming the joint receptacle 730A or 730B respectively. The second part 710B is complementary to the first part 710A and connectable interlockingly therewith. The two-part construction allows, inter alia, a peripheral retaining rim 733 at the opening to each joint receptacle 730A or 730B respectively for engagement of the joint head 720. The retaining rim 733 serves in particular as an axial stop on extension or elongation, but may also restrict three-dimensional deflectability by striking against the cylindrical neck which bears the engaging joint head 720. In the opposite direction, on retraction, the joint head 720 strikes on the inside against the inner surface of the joint receptacle 730A or 730B respectively.

As FIGS. 7C-7D illustrate, as a result of the construction of the webs 72, the second part 710B is secured stably to the first part 710A. This is achieved in that the two parts 710A, 710B in each case jointly form a shaft, pin or the like, for example a square, from two halves 711, onto which a conjugate receptacle 712, for example a square receptacle, is slipped in matching manner. On fastening of the shell segments 71 to one another, the two halves 711 are secured by insertion into the receptacle 712, wherein each shell segment 71 is fastened to the core 710, for example using a self-tapping screw. The receptacle 712 is formed in an internal projection which is in one piece with the shell segment 71 and which then holds and secures the constituent parts 710A, 710B of the core 710 stably against one another. Furthermore, FIGS. 7A-7D also show, in the first part 710A, the coaxial, open through-passage opening 725 for a return element 300 (cf. FIGS. 5A-5B), the mouths of which are flared for protective purposes.

As a comparison of FIG. 7C with FIG. 7D shows, the chain links 700A, 700B differ in the direction of rotation of the respective joint receptacle 730A or 730B respectively, which is either configured for clockwise rotation R1 or anticlockwise rotation R2, wherein the joint head 720 in each case remains identically configured. Joint head 720 and joint receptacles 730A and 730B respectively allow the desired axial longitudinal displacement relative to one another and at the same time also predetermine the desired relative rotation. To this end, the inner surface of the joint receptacles 730A, 730B and the joint head 720 also accordingly interact in this exemplary embodiment in such a way that the connection serves as a type of rotary guide or forcible guide, which on extension or retraction predetermines rotation of the two connected chain links 700A, 700B. The joint head in FIGS. 7A-7D is here embodied with an approximately triangular basic shape corresponding to that of FIG. 2E.

Figure 8:
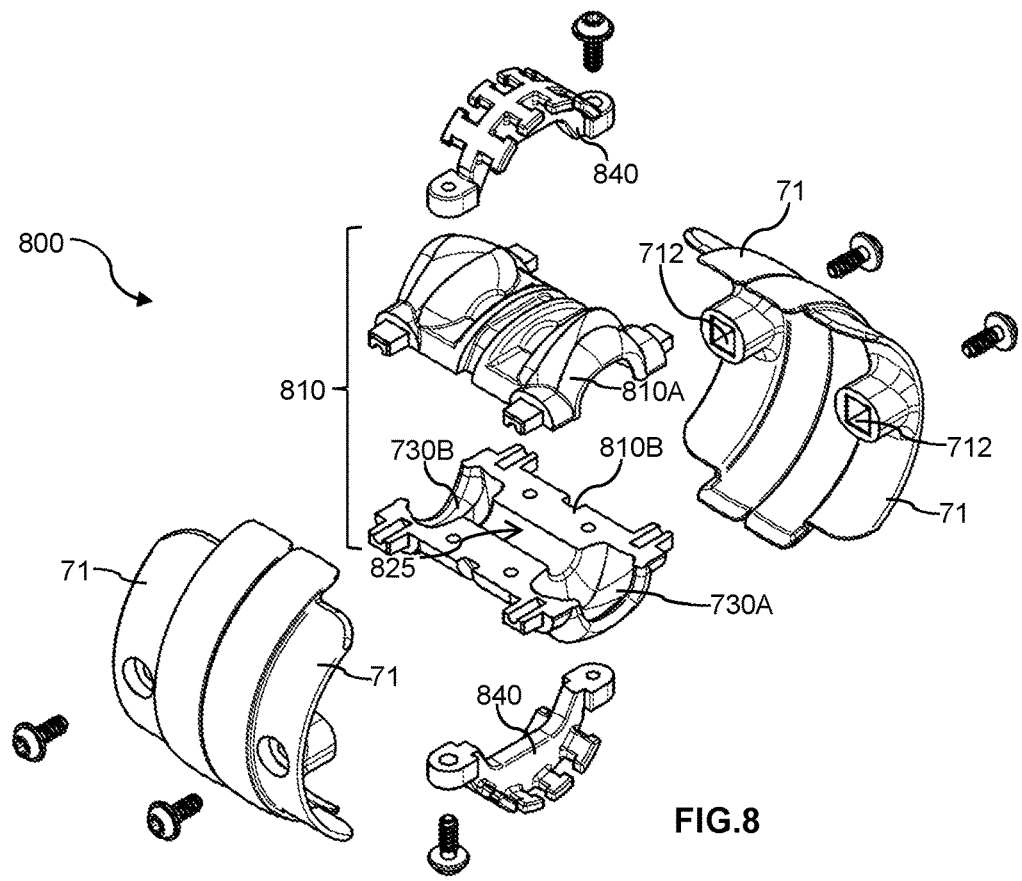
FIG. 8 shows an exemplary embodiment of a middle piece for connecting sub-portions, rotating in opposite directions, of chain links according to FIG. 7C or FIG. 7D.

FIG. 8 shows a construction for a middle piece 800 for connecting the sub-portions 11A, 11B, i.e. from the end chain links 700A or 700B respectively thereof in the middle region of the variable-length portion 11 between the sub-portions 11A, 11B (FIGS. 6B-6C). The fundamental construction is similar to FIGS. 7A-7D, in particular with a two-part core 810 of a first part 810A and a second part 810B, which are secured together on the basis of a plurality of, here four identically constructed, shell segments 71, for example as described above in relation to FIGS. 7C-7D. The core 810 has or forms at its two longitudinal ends in each case one of the two complementary joint receptacles 730A or 730B respectively for connection with the joint head 720 of the connected chain link 700A or 700B respectively. In this way, the extension length L2−L1 is increased in comparison with a simpler, rigid connection of the sub-portions 11A, 11B.

The middle piece 800 additionally has strain relief elements 840 which are fastened to both sides of the core 810, for example here in interlocking and noninterlocking manner by screwing. Each strain relief element 840 has a plurality of T-shaped holders projecting axially on both sides for fastening the lines, for example using cable ties, to the middle piece 800 and relieving strain thereon. The strain relief elements 840 may be screwed together as two identical clip-like parts and engage around the core 810 in order at the same time to achieve additional securing of the constituent parts 810A, 810B thereof to one another. The middle piece 800 shown here consists, screws excepted, of just four components, the constituent parts 810A, 810B of the core 810, two pairs of shell segments 71 and two strain relief elements 840. These components are, like the parts of the links 700A, 700B, preferably made by plastics injection molding. FIG. 8 also illustrates the passage opening 825 in the middle piece 800, for the rope-like return element 300 (not shown in FIGS. 6-9).

Figure 9:
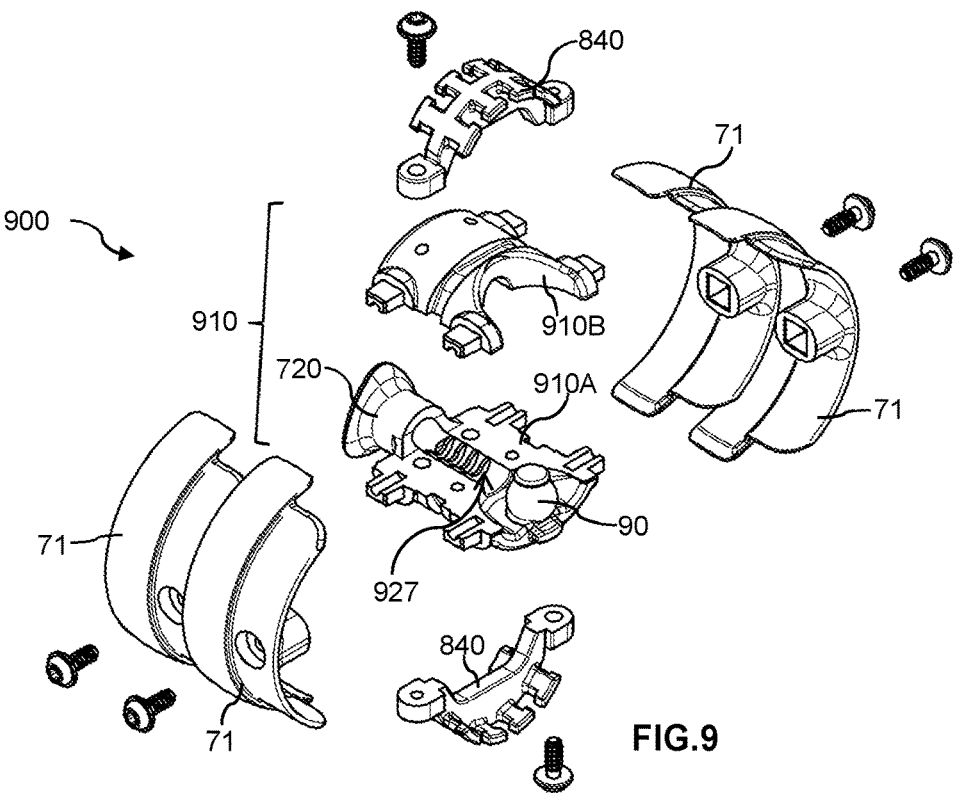
FIG. 9 shows an exemplary embodiment of an end piece or connection piece for connecting chain links according to FIGS. 7A-7D with a conventional chain link.

FIG. 9 shows an end piece 900 for connecting each longitudinal end of the variable-length portion 11 from the chain links 700A or 700B respectively with the joint socket of a conventional chain link in the construction of EP 1 616 376 B1 or U.S. Pat. No. 7,439,446 B2 (=WO 2004/093279 A1), the teaching of which is in this respect included herein by reference. To this end, the core 910 consisting of two parts 910A, 910B has a joint head 720 at one axial end for connection with a joint receptacle 730A or 730B of a chain link 700A or 700B respectively and a per se known ball-shaped joint head 90 according to EP 1 616 376 B1 or U.S. Pat. No. 7,439,446 B2 (=WO 2004/093279 A1) at the other axial end. At both ends of the variable-length portion 11, end pieces 900 of identical construction can be used if needed. Furthermore, on the inside the end piece 900 forms clamping collars 927, lying coaxially against the parts 910A. 910B, of a rope clamp with transverse ribs for axial end fastening of the rope-like return element 300. The end piece 900 may at the same time fasten the ends of the return element 300 (not shown) without additional clamping rings, as shown in FIGS. 5A-5B. As with the clamping rings 302, the rope clamps formed by the clamping collars 927 may also be used to adjust the pretensioning of the return element 300, in that the latter is correspondingly pretensioned and then fastened axially to the end piece 900. To this end, the combination with clip-like strain relief elements 840 is advantageous, these being able, as clamping clips, to tension the components 910A, 910B relative to one another using the screw connection. Accordingly, the two clip-like strain relief elements 840 preferably also engage around the two clamping collars 927.

FIGS. 10A-10B show a further chain link 100 for a variable-length portion 11 according to FIG. 1A. This variant differs from the above examples on the one hand in the elliptical basic shape of the joint head 120 and in the corresponding configuration of the joint receptacle 130 (only one of the two is shown here). Furthermore, FIG. 10B shows an alternative for securing a multipart core 110 of two parts 110A, 110B by a snap-fit connection of arm-shaped projections 111, on both sides, of the parts 110A, 110B in corresponding receptacles 112 in the shell segments 71, which otherwise correspond for example to FIGS. 7-9.

A similar variant is shown in FIG. 11, but here a tubular, circumferentially closed line guide apparatus 10 is implemented. The chain link 1100 is here formed substantially of two moldings 1100A, 1100B, which are connected together via a tongue and groove joint at the interface of the webs and/or secured by additional securing elements 1111. Otherwise, the construction may correspond to one of the above exemplary embodiments, in particular with regard to the articulated connection of the chain links 1100.

FIGS. 12A-12E show a further chain link 1200 with two interchangeable multipart inserts 1250A, 1250B of a joint receptacle 1230A or 1230B respectively (FIG. 12D, FIG. 12E) for the joint head 1220 (here as in FIG. 7), which selectably predetermine one of two opposing directions of rotation R1, R2. The inserts 1250A, 1250B are multipart, here for example in each case of three individual parts, preferably injection moldings in the form of sectors of a ring. The inserts 1250A, 1250B may be snap-fitted by axial insertion into a receptacle 1260 configured as a holder, in the core of the chain link 1200. The multipart construction may considerably simplify manufacture by injection molding, in particular if the main body of the chain link 1200 is to be manufactured in one piece. Each of the two inserts 1250A, 1250B here forms one of two receptacles 1230A, 1230B for relative rotation in opposing directions, clockwise or anti-clockwise, for the respective sub-portion 11A, 11B. By way of latching in the axial direction, a joint head 1220 can be plugged axially with an insert 1250A, 1250B attached thereto into the holder 1260 in the core of the adjoining chain link 1200, which may simplify assembly. Otherwise, the construction is largely similar to FIGS. 2A-2E, inter alia with three radial webs 1202, which connect a circumferentially closed shell 1201 with the core 1210.

Finally, FIGS. 13A-13B show a variant of a chain link 1300 according to FIGS. 2-3, in which the desired relative rotation is brought about via radially outer guide parts, here outer rotary guide projections 1320 and inner rotary guide recesses 1330, similar to screw threads, in the shell parts of the chain link 1300. The rotary guide recesses 1330 or rotary guide projections 1320 may be embodied as obliquely or helically running grooves and projections engaging therein at overlap regions of the shell segments.

Axial stops may here, as in FIGS. 2-3, likewise be implemented on the shell parts. The chain links 1300 thus do not have joint head or joint receptacle on the core, unlike for example in FIGS. 2-3.

As the exemplary embodiments show, the variable-length portion 11 may be embodied by links of different constructions, which are in each case relatively rotatable in pairs about the longitudinal direction L and connected together in longitudinally adjustable manner. The return element 300 may also be implemented in various ways, and does not necessarily have to be provided coaxially to the longitudinal direction or as an expander rope.

LIST OF REFERENCE SIGNS

FIGS. 1A-1D
1 Industrial robot
2, 3 Connection points
10 Line guide apparatus
11 Variable-length portion
12 Three-dimensionally deflectable portion
FIGS. 2A-2E, FIGS. 3A-3C, FIG. 4
200 Chain link
201 Shell
202 Web
203 Chamber/accommodation space
205 Rim (stop)
207 Annular collar (limit stop)
210 Core
220 Joint head
221 Sides (joint head)
222 Vertices/points
223 Journal
225 Passage openings
230 Joint receptacle
232 Inner surface (joint receptacle)
300 Return element
302 Clamping ring
L Longitudinal axis S1, S2 Helical courses
FIGS. 5A-5B
11A First sub-portion
11B Second sub-portion
200A, 200B Chain links
250 Middle piece
d axial play/relative adjustment amount
R1, R2 Direction of rotation
L1 Length, retracted
L2 Length, extended
FIGS. 6A-6G, FIGS. 7A-7D, FIGS. 8-9
11 Variable-length portion
11A First sub-portion
11B Second sub-portion
60 Line
71 Shell segment
71A, 71B Insertion opening
72 Web
90 Joint head (conventional)
61A, 61B Helix coil/helical course
700A; 700B Chain links
710 Core
710A, 710B Core parts
711 Half (securing shaft)
712 Receptacle
720 Joint head
725 Passage opening
730A; 730B Joint receptacle
733 Retaining rim (axial stop)
800 Middle piece
810 Core (middle piece)
810A, 810B Core parts
825 Passage openings
840 Strain relief element
900 End piece
910 Core (end piece)
910A, 910B Components
927 Clamping shell (rope clamp)
R1, R2 Direction of rotation
L1/L2 Length, retracted/extended
FIGS. 10A-10B, FIG. 11
100 Chain link; 110 Core; 110A, 110B Core parts; 120 Joint head (elliptical); 130 Joint receptacle
1100 Chain link; 1100A, 1100B Molded parts; 1111 Securing element
FIGS. 12A-12E
1200 Chain link; 1201 Shell; 1202 Web; 1210 Core; 1220 Joint head; 1230A, 1230B Joint receptacle; 1250A, 1250B Inserts (for joint receptacle); 1260 Receptacle (for inserts)
FIGS. 13A-13B

What is claimed is:

1. A line guide apparatus for guiding lines between a first and a second connection point movable relative to the first, comprising:
    a plurality of links, which form an accommodation space for lines, are arranged successively in a longitudinal direction and are connected together in articulated manner by a respective articulated connection, wherein the articulated connection allows three-dimensional deflection of the connected links relative to one another; and
    at least one elastic return element;
    wherein the line guide apparatus has a variable-length portion, which comprises a number of links which are longitudinally adjustable relative to one another for elongation of the variable-length portion in the longitudinal direction; and
    wherein the return element is elastically longitudinally expandable and is arranged in such a way that it exerts on the variable-length portion a return force which counteracts elongation of the variable-length portion.

2. The line guide apparatus according to claim 1, wherein at least the number of links of the variable-length portion of are connected together so as to be relatively rotatable relative to one another about the longitudinal direction and longitudinally adjustable relative to one another for elongation of the variable-length portion in the longitudinal direction.

3. The line guide apparatus according to claim 2, wherein the connection of in each case successive links of the variable-length portion is configured such that longitudinal adjustment of two links relative to one another predetermines as a function of direction a relative rotation in the one or the opposing direction of rotation about the longitudinal direction.

4. The line guide apparatus according to claim 3, wherein the variable-length portion has a first sub-portion, in which connected links in each case rotate in relative manner on elongation in a first direction of rotation, and a second sub-portion, in which connected links rotate in relative manner on elongation in a second direction of rotation, which is the opposite direction to the first direction of rotation.

5. The line guide apparatus according to claim 4, wherein a middle piece is provided between two sub-portions of the variable-length portion, wherein the middle piece has strain relief for lines to be guided and/or has a greater structural length than the structural length or pitch of the number of links of the variable-length portion, and/or wherein the middle piece is connected at each of its longitudinal ends in each case with one of the sub-portions rotatable in opposing directions via respectively opposing rotary guides.

6. The line guide apparatus according to claim 3, wherein the connection comprises a rotary guide, which, on elongating longitudinal adjustment of the two links, brings about relative rotation thereof in a first direction of rotation and, on return longitudinal adjustment of the two links, brings about opposing relative rotation thereof.

7. The line guide apparatus according to claim 3, wherein:
    at least the links of the variable-length portion in each case have a central core with a central passage opening through which the elastic return element is passed; and/or
    the core has guide elements of the rotary guide; and/or the core, on longitudinal adjustment of two links relative to one another, predetermines as a function of direction a relative rotation in the one or the opposing direction of rotation about the longitudinal direction.

8. The line guide apparatus according to claim 7, wherein at least the links of the variable-length portion in each case have a central core, which forms a joint head and a joint receptacle opposite in the longitudinal direction, which latter is matchingly configured for articulated connection with the joint head of the next link, wherein joint head and joint receptacle form the rotary guide for predetermining the relative rotation.

9. The line guide apparatus according to claim 8, wherein:
    the joint head has a basic shape with a substantially triangular cross-section, whose three vertices are guided as guide elements against corresponding helically running guide faces on the inside of the joint receptacle; or the joint head has a basic shape with a substantially elliptical cross-section, whose two major vertices are guided as guide elements against corresponding helically running guide faces on the inside of the joint receptacle; and/or joint head and joint receptacle form an articulated connection which is longitudinally adjustable, relatively rotatable and, for three-dimensional mutual deflection of the connected links, swivelable about at least two axes perpendicular to the longitudinal direction.

10. The line guide apparatus according to claim 8, wherein:

the central core, at least the joint receptacle, is formed by two separate components which are connectable to one another; or the joint receptacle is formed by at least two separate insert parts, which are attached to the core in a receptacle, wherein each insert part in each case has a helically running inner surface.

11. The line guide apparatus according to claim 2, wherein at least the links of the variable-length portion or all links in each case have a central core with at least two substantially radial webs by way of which in each case at least one shell segment is retained, to delimit the accommodation space in the radial direction.

12. The line guide apparatus according to claim 11, wherein, at least in the variable-length portion, the shell segments form a circumferentially and longitudinally closed tube, wherein the connection of respectively successive links comprises a rotary guide at the shell segments.

13. The line guide apparatus according to claim 11, wherein the shell segments are arranged in upwardly pivotable manner and/or are of flexible construction and form an insertion opening between two shell segments.

14. The line guide apparatus according to claim 2, wherein the connection longitudinally adjustable in the longitudinal direction in each case comprises at least two longitudinal stops, which restrict the longitudinal adjustment of two links in both directions, wherein the longitudinal stops are formed on the core and/or on shell segments.

15. The line guide apparatus according to claim 14, wherein the longitudinal play of the longitudinally adjustable connection amounts to at least 20% of the link pitch or axial structural length of the link.

16. The line guide apparatus according to claim 2, wherein at least the number of links of the variable-length portion are connected or couplable in such a way that longitudinal adjustment of two links relative to one another brings about relative rotation thereof.

17. The line guide apparatus according to claim 1, wherein:

the at least one return element is arranged to exert pretensioning in the longitudinal direction, which pretensioning contracts the variable-length portion; and/or the at least one elastic return element is embodied as a rope or band.

18. The line guide apparatus according to claim 17, wherein an adjusting device for adjusting the pretensioning of the return element is provided at at least one end region of the variable-length portion.

19. The line guide apparatus according to claim 1, further comprising at least one line guided in the line guide apparatus, wherein the at least one line is arranged to run helicoidally or helically in the variable-length portion.

20. A robot comprising a line guide apparatus according to claim 1.

* * * * *